Jan. 17, 1961     S. BIRKLAND     2,968,178

CAN TESTING HEAD

Filed Oct. 5, 1956

INVENTOR.
STELLAN BIRKLAND
BY *Charles H. Erne*
*Leland R. McCann*
*George W. Reiber*
ATTORNEYS

2,968,178

CAN TESTING HEAD

Stellan Birkland, San Francisco, Calif., assignor to American Can Company, New York, N.Y., a corporation of New Jersey Filed Oct. 5, 1956, Ser. No. 614,314

6 Claims. (Cl. 73—40)

The present invention relates to container or can testing machines in which the cans are subjected to air under pressure to detect those which leak and has particular reference to an improved can testing head for sealing off the open ends of the cans during the test.

In some testing machines, the cans to be tested are individually confined in a sealed testing head which holds the open end of the can during the testing operation firmly against a resilient sealing pad located within the head. The open end of the can usually is provided with an outwardly flared flange and the repeated engagement of this flange against the pad, during the testing of cans moving in a substantially continuous procession, rapidly wears the pad due to a continuous digging of the raw edge of the flange into the resilient material of the pad. This produces a high cost maintenance condition and more importantly as the pad wears causes the flange and a portion of the can body adjacent thereto to be embedded in the pad to such an extent that these portions cannot be tested for leaks.

An object of the instant invention is the provision of an improved can testing head which overcomes these difficulties and which provides for an efficient seal at the can body flange without undue wearing of the sealing pad.

Another object is the provision of such an improved can testing head in which the testing seal is maintained at the outer edge of the can body flange so that the flange and the immediately adjacent portion of the can body are fully exposed for testing along with the other portions of the can.

Numerous other objects and advantages of the invention will be apparent as it is better understood from the following description, which, taken in connection with the accompanying drawings, discloses a preferred embodiment thereof.

Referring to the drawings.

Figure 1:
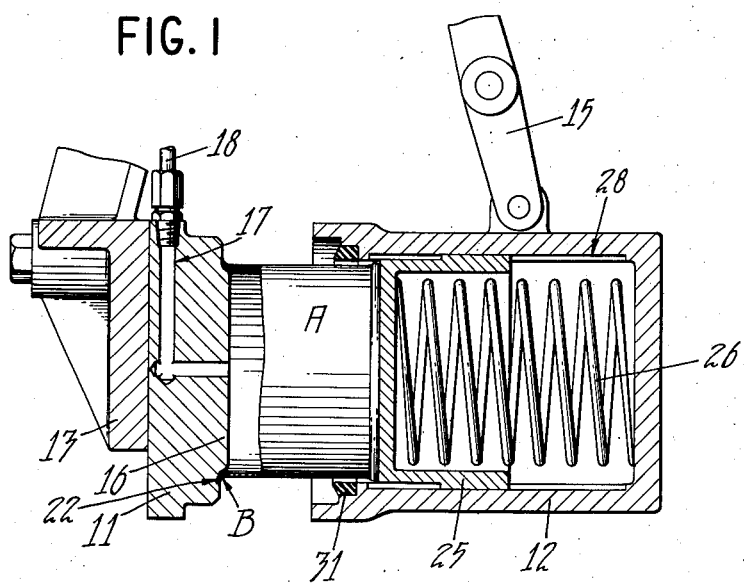
Figure 1 is a sectional view of a can testing head embodying the instant invention, the view illustrating the head partially open and a can in position in the head before testing.

As a preferred or exemplary embodiment of the instant invention the drawings illustrate principal parts of a can testing head of a multiple head testing machine of the character disclosed in United States Patent 2,232,711, issued February 25, 1941, to W. W. Maher on Can Testing Apparatus. In such a machine sheet metal cans A (Fig. 1) having one end sealed and the opposite end open and surrounded by an outwardly flared flange B (Fig. 3), are subjected to air under pressure and if found to leak are discharged from the machine by way of a leaky can outlet, while good cans, i.e. cans which do not leak, are discharged from the machine by way of a good can outlet.

Testing of a can is effected in a testing head comprising a sealing pad 11 (Figs. 1 and 2) and a cradle or housing 12 which is adapted to surround and confine the sides and bottom of the can. There are a plurality of these heads arranged in a circle around a pair of spaced and parallel rotatable support wheels 13 (one of which is shown in the drawings) which are continuously rotated. The wheels may be horizontal as shown in the above mentioned Maher Patent 2,232,711 or may be vertical as disclosed in United States Patent 2,019,517, issued November 5, 1935, to M. E. Widell on Can Testing Machine. The cans A are introduced into and discharged from the testing heads in the same manner as disclosed in the above mentioned patents.

The sealing pad 11 of each testing head is relatively fixed and the cradle 12 of each head is disposed in axial alignment with its sealing pad and is movable toward and away from the pad for the positioning of a can A between them with the open end of the can adjacent the pad for testing. This movement of the cradle is effected by a lever arm 15 attached to the cradle and actuated as shown in the Maher Patent 2,232,711 above mentioned.

The sealing pad 11 preferably is made from a relatively hard material such as metal or plastic and on its inner face is provided with a raised boss 16 (see also Fig. 3) which serves to loosely centralize and locate the open end of the can A on the pad. This boss 16 is provided with a channel 17 which extends through the pad 11 and communicates with a pipe 18 which leads to a suitable source of compressed air to be introduced into the can A for testing the can. Where the cans are to be tested under a negative pressure the pipe 18 leads to a suitable source of vacuum.

Figure 3:
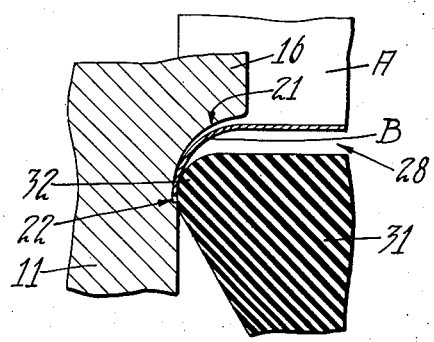
Fig. 3 is an enlarged fragmentary sectional view of portions of the testing head immediately adjacent the can body flange and showing how a seal is made against the outer edge of the flange.

In order to provide for full testing of the can body flange B as well as the remainder of the can A, the outer periphery of the boss 16 is formed with a curved rigid clearance seat 21 (Fig. 3) which merges into a shallow recess 22 having a rigid bottom or seat formed in the inner face of the sealing pad 11, surrounding the boss 16. The recess 22 preferably is of a depth substantially equal to the thickness of the flange B so that the outer face of a seated flange is substantially flush with the inner face of the sealing pad. The recess 22 is slightly greater in diameter than the outside diameter of the flange so as to clear the flange as best shown in Fig. 3. The flange B of a can A seated against the bottom of the recess 22 is spaced away from the curved seat 21 and is thus fully exposed along its inner face excepting adjacent the outer peripheral edge of the flange where it contacts the bottom of the recess 22. This is the testing position of a can A.

The can A is held in this testing position by a yieldable plunger 25 which is slidably disposed in the cradle 12 and which is backed up by a compression spring 26 interposed between the plunger and the bottom of the cradle.

Figure 2:
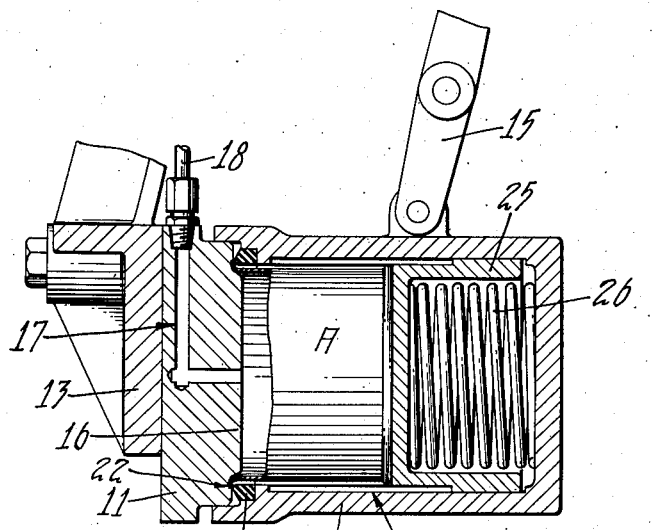
Fig. 2 is a sectional view similar to Fig. 1 and illustrating the head closed and the can in testing position.

When a can A is interposed between the sealing pad 11 and the cradle 12 for testing, the cradle moves toward the closed end or bottom of the can and engages the plunger 25 against the can bottom to press the open end of the can against the sealing pad 11 in the position above described. With the can thus held against the sealing pad 11, the cradle 12 continues to move toward the sealing pad while the plunger remains stationary and thus the cradle moves into position completely surrounding, confining and enclosing the sides and bottom of the can as shown in Fig. 2. The inner face of the cradle 12 is spaced away from the sides of the can A to provide a surrounding chamber 28 to facilitate testing of the can for leaks as described in the above mentioned Maher patent.

In this closed position of the cradle 12 relative to the sealing pad 11, the outer peripheral edge of the flange B of the enclosed can A is sealed off from the cradle chamber 28 to seal the interior of the container and to insure against leakage of air along the line of contact between the outer edge of the flange and the sealing pad 11. This seal preferably is effected by a resilient sealing gasket or ring 31 which preferably is carried in the cradle 12 and which preferably is made of rubber or other resilient material.

The sealing gasket 31 preferably is formed with an outwardly projecting rounded edge portion 32 (Fig. 3) which is located to make sealing engagement with the outer peripheral marginal portion of the can body flange B and the inner face of the sealing pad 11 adjacent the recess 22 and thus bridge or extend across the space between the edge of the flange and the edge of the recess to effectively seal off the edge of the flange and to seal the interior of the container relative to the sealing pad.

Hence with such a construction of sealing head, embodying a rigid seat 22 for supporting the outer peripheral marginal portion of the can body flange B and a resilient sealing ring 31 in the cradle 12 for sealing the marginal edge of the flange B against leakage of air, an efficient seal is provided which permits of full exposure of the flange B for testing along with the remainder of the can, without undue wearing away of the sealing seat (seat 21 and bottom of recess 22) with the result that maintenance costs of the sealing heads are greatly reduced and can production is considerably increased.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Means for sealing the outwardly flared flanged open end of a metal can to be tested for leaks, comprising a sealing pad formed of hard nonresilient material provided with an integral peripheral curved recess constituting a rigid seat for receiving the open flanged end of said can, a resilient sealing gasket surrounding said can, and means for moving the open flanged end of said can into engagement with said seat while moving said gasket into sealing engagement with the outer peripheral portion of said can flange and the outer peripheral edge of said seat.

2. The structure of claim 1 wherein said rigid seat engages against the outer peripheral marginal portion of said container flange to expose the remainder of said flange for testing with the interior of said can.

3. The structure of claim 1 wherein the outer periphery of said sealing pad recess is of a depth substantially equal to the thickness of said can end flange to facilitate sealing said flange against said pad by said gasket.

4. The structure of claim 1 wherein said rigid integral seat of said sealing pad is composed of hard material such as metal.

5. The structure of claim 1 wherein said rigid integral seat of said sealing pad is composed of hard plastic material.

6. The structure of claim 1, wherein said resilient sealing gasket is carried by the forward open end of a movable cradle for surrounding and carrying said can, said cradle having means for moving the same into and out of can sealing engagement with said sealing pad seat.

References Cited in the file of this patent

UNITED STATES PATENTS

| | | |
|---|---|---|
| 715,324 | Wachhorst et al. | Dec. 9, 1902 |
| 2,387,743 | Cameron et al. | Oct. 30, 1945 |
| 2,394,875 | Rommel | Feb. 12, 1946 |
| 2,433,043 | Gray | Dec. 23, 1947 |
| 2,655,182 | Hayes et al. | Oct. 13, 1953 |